(12) United States Patent
Guan et al.

(10) Patent No.: US 12,535,152 B2
(45) Date of Patent: Jan. 27, 2026

(54) MICRO-FLOW THROTTLING DEVICE

(71) Applicant: SHANGHAI INSTITUTE OF SPACE PROPULSION, Shanghai (CN)

(72) Inventors: Liang Guan, Shanghai (CN); Wei Shi, Shanghai (CN); Ming Yang, Shanghai (CN); Jiajie Huang, Shanghai (CN); Fangfang Yang, Shanghai (CN); Zimo Wang, Shanghai (CN); Yichi Zhang, Shanghai (CN)

(73) Assignee: SHANGHAI INSTITUTE OF SPACE PROPULSION, Shanghai (CN)

( * ) Notice: Subject to any disclaimer, the term of this patent is extended or adjusted under 35 U.S.C. 154(b) by 0 days.

(21) Appl. No.: 18/722,668

(22) PCT Filed: Nov. 18, 2022

(86) PCT No.: PCT/CN2022/132722
§ 371 (c)(1),
(2) Date: Jun. 21, 2024

(87) PCT Pub. No.: WO2023/116290
PCT Pub. Date: Jun. 29, 2023

(65) Prior Publication Data
US 2025/0067356 A1    Feb. 27, 2025

(30) Foreign Application Priority Data
Dec. 21, 2021  (CN) .......................... 202111575059.X

(51) Int. Cl.
*F16K 47/12* (2006.01)
*F16K 47/06* (2006.01)
(Continued)

(52) U.S. Cl.
CPC .............. *F16K 47/12* (2013.01); *F16K 47/06* (2013.01); *F16L 55/02772* (2013.01); *F16K 17/20* (2013.01)

(58) Field of Classification Search
None
See application file for complete search history.

(56) References Cited

U.S. PATENT DOCUMENTS 660,128 A * 10/1900 Sowle ..................... F16K 15/20
251/216
1,494,066 A * 5/1924 Pasche-Huguenin ........................
F16L 55/02772
137/802

(Continued)

FOREIGN PATENT DOCUMENTS

| CN | 1118180 A | 3/1996 |
| CN | 103089834 A | 5/2013 |

(Continued)

*Primary Examiner* — Matthew W Jellett
(74) *Attorney, Agent, or Firm* — TROUTMAN PEPPER LOCKE LLP; Christopher C. Close, Jr.

(57) ABSTRACT

A micro-flow throttling device, comprising: a casing used for assembling; a throttling structure mounted inside the casing to form resistance to control a fluid flow, wherein the throttling structure comprises a first axial hole formed inside a fine threaded rod, a first radial hole is formed on one side of the first axial hole, a fine thread flow channel is mounted on one side of the first radial hole, and a second cavity is formed between the fine thread flow channel and a coarse thread flow channel; a regulating structure mounted on the casing and used for regulating the flow rate of the fluid; and a butt-joint structure mounted on the inner wall of the casing and used for performing disassembly and assembly limiting on the throttling structure.

9 Claims, 5 Drawing Sheets

(51) Int. Cl.
*F16L 55/027* (2006.01)
*F16K 17/20* (2006.01)

(56) References Cited

U.S. PATENT DOCUMENTS

| | | | | |
|---|---|---|---|---|
| 1,918,959 | A * | 7/1933 | Culp | F16N 27/02 251/223 |
| 2,323,115 | A * | 6/1943 | Bryant | G05D 13/00 415/72 |
| 2,532,019 | A * | 11/1950 | Goldberg | G05D 7/0186 62/511 |
| 3,143,145 | A * | 8/1964 | Kauss | G01N 30/32 251/126 |
| 3,184,214 | A * | 5/1965 | King | F16K 31/5282 251/270 |
| 3,374,858 | A * | 3/1968 | Richards | F16K 47/12 181/280 |
| 3,384,338 | A * | 5/1968 | Dermody | F16K 47/06 251/216 |
| 3,685,786 | A * | 8/1972 | Woodson | A61M 5/16877 251/340 |
| 3,934,812 | A * | 1/1976 | Pett | F16K 47/06 138/43 |
| RE29,546 | E * | 2/1978 | Blass | F16L 55/00 405/47 |
| 4,106,525 | A * | 8/1978 | Currie | F16L 55/02772 138/44 |
| 4,176,683 | A * | 12/1979 | Leibinsohn | F16K 47/06 251/126 |
| 4,418,723 | A * | 12/1983 | Koni | G01F 1/40 138/42 |
| 4,541,608 | A * | 9/1985 | Forester | F16K 31/508 251/266 |
| 4,634,434 | A * | 1/1987 | Marino, Jr | F16K 47/06 251/126 |
| 4,679,597 | A * | 7/1987 | Stein | F16L 55/02772 181/280 |
| 6,398,543 | B1 * | 6/2002 | Wymaster | F23D 11/105 251/126 |
| 6,581,902 | B2 * | 6/2003 | Michau | F16K 47/12 251/126 |
| 2004/0004203 | A1 * | 1/2004 | Smith | F16K 47/06 251/126 |

FOREIGN PATENT DOCUMENTS

| | | |
|---|---|---|
| CN | 203035990 U | 7/2013 |
| CN | 103775685 A | 5/2014 |
| CN | 114352782 A | 4/2022 |

* cited by examiner

MICRO-FLOW THROTTLING DEVICE

CROSS-REFERENCE TO RELATED APPLICATION

This patent application is a national stage application of International Patent Application No. PCT/CN2022/132722, filed on Nov. 18, 2022, which claims the benefit and priority of Chinese Patent Application No. 202111575059.X, filed with the China National Intellectual Property Administration on Dec. 21, 2021, the disclosure of which is incorporated by reference herein in its entirety as part of the present application.

TECHNICAL FIELD

The present disclosure relates to the field of throttling, in particular to a micro-flow throttling device.

BACKGROUND

Single-component liquid rocket engines are mostly micro and small liquid rocket engines, and are a branch of liquid rocket engines. The engine is used for providing impulse and performing attitude control for missiles, launch vehicles, satellites, spaceships, detectors and other aircrafts. The injector is a very important component in the single-component engine, and affects the working life, starting performance, efficiency and working stability of the thrust chamber.

The pressure drop of the injector is a key parameter of the injector, and affects the performance of the engine from different angles. If the pressure drop of the injector is too small, the instability of the engine can be caused, the roughness of the chamber pressure is increased to generate low-frequency oscillation. Therefore, in order to ensure the stability of engine operation, the pressure drop of the injector should be as high as possible on the premise of not seriously affecting the performance. At present, one or more capillary tubes are used to control the pressure drop of the conventional thrust single-component engine injector. The pressure drop generated when the propellant flows through the capillary tubes is roughly proportional to the square of the propellant flow rate. When the propellant flow rate is determined, according to the method of increasing the pressure drop, the diameter of the propellant flow channel is reduced or the length of the flow channel is increased. The propellant flow rate of the micro-thrust mono-component engine is as low as 0.1 g/s. In order to ensure the pressure drop of the injector under the flow rate, the length of the capillary tube often exceeds the accommodation range of the injector structure. The development of the micro-flow throttling device has become a difficult problem in the field of micro-thrust single-component engines.

A throttle device for an internal combustion engine and a method for manufacturing the throttling device are disclosed in Patent document CN1118180A. Throttling is carried out by using a metal butterfly throttle valve, but the throttling of the valve cannot achieve the above-mentioned flow accuracy, and flow regulation in this small flow rate cannot be realized.

SUMMARY

Aiming at the defects in the prior art, the purpose of the present disclosure is to provide a micro-flow throttling device.

The micro-flow throttling device provided by one or more embodiment of the present disclosure includes a casing used for assembling, a throttling structure mounted inside the casing to form resistance to control a fluid flow, a regulating structure mounted on the casing and used for regulating the flow rate of the fluid, and lugs mounted on the inner wall of the casing and used for performing disassembly and assembly limiting on the throttling structure.

Further, the regulating structure includes an internal thread sleeve. The internal thread sleeve is mounted inside the casing. An inner wall of the internal thread sleeve is provided with an internal thread body. A coarse threaded rod is mounted inside the internal thread sleeve. A fine threaded rod is arranged on one side of the coarse threaded rod.

Further, a surface of the fine threaded rod is provided with a fine thread body, and a surface of the coarse threaded rod is provided with a coarse thread body.

Further, the inner diameter of the casing is larger than the outer diameter of the internal thread sleeve, the fine threaded rod and the fine thread body are in threaded connection with the internal thread body, and the internal thread sleeve is of a sliding structure inside the casing.

Further, the throttling structure includes a first axial hole. The first axial hole is formed inside a fine threaded rod. A first radial hole is formed on one side of the first axial hole. A fine thread flow channel is mounted on one side of the first radial hole. A second cavity is formed between the fine thread flow channel and a coarse thread flow channel.

Further, a second axial hole is formed inside the coarse threaded rod. A second radial hole is mounted on one side of the second axial hole. The second axial hole and the second radial hole are interconnected. A coarse thread flow channel is arranged on one side of the second radial hole. The second radial hole and the coarse thread flow channel are interconnected.

Further, the first axial hole and the first radial hole are interconnected, and the first radial hole and the fine thread flow channel are interconnected.

Further, the lugs are all arranged on the inner wall of the casing. Grooves are formed in one side of the casing.

Further, four groups of lugs are arranged on the inner wall of the casing, and the four groups of lugs are symmetrically distributed inside the casing.

BRIEF DESCRIPTION OF THE DRAWINGS

Other features, objects and advantages of the present disclosure will become more apparent by reading the detailed description of non-restrictive embodiments, which is made with reference to the attached figures.

Reference signs: 1, regulating structure; 101, fine threaded rod; 2, casing; 3, internal thread sleeve; 4, coarse threaded rod; 5, throttling structure; 501, first axial hole; 6, first radial hole; 7, second axial hole; 8, second radial hole; 9, fine thread body; 10, internal thread body; 11, fine thread flow channel; 12, coarse thread flow channel; 13, coarse thread body; 14, first cavity; 15, second cavity; 16, third cavity; 1701, lug; and 18, groove; 19, clamping structure.

DETAILED DESCRIPTION OF THE EMBODIMENTS

The following describes the present disclosure in conjunction with specific embodiments. The following embodiments help those skilled in the art to further understand the present disclosure, but do not limit the present disclosure in any way. The following embodiments help those skilled in the art to further understand the present disclosure, but do not limit the present disclosure in any way. These all belong to the protection scope of the present disclosure.

Figure 1:
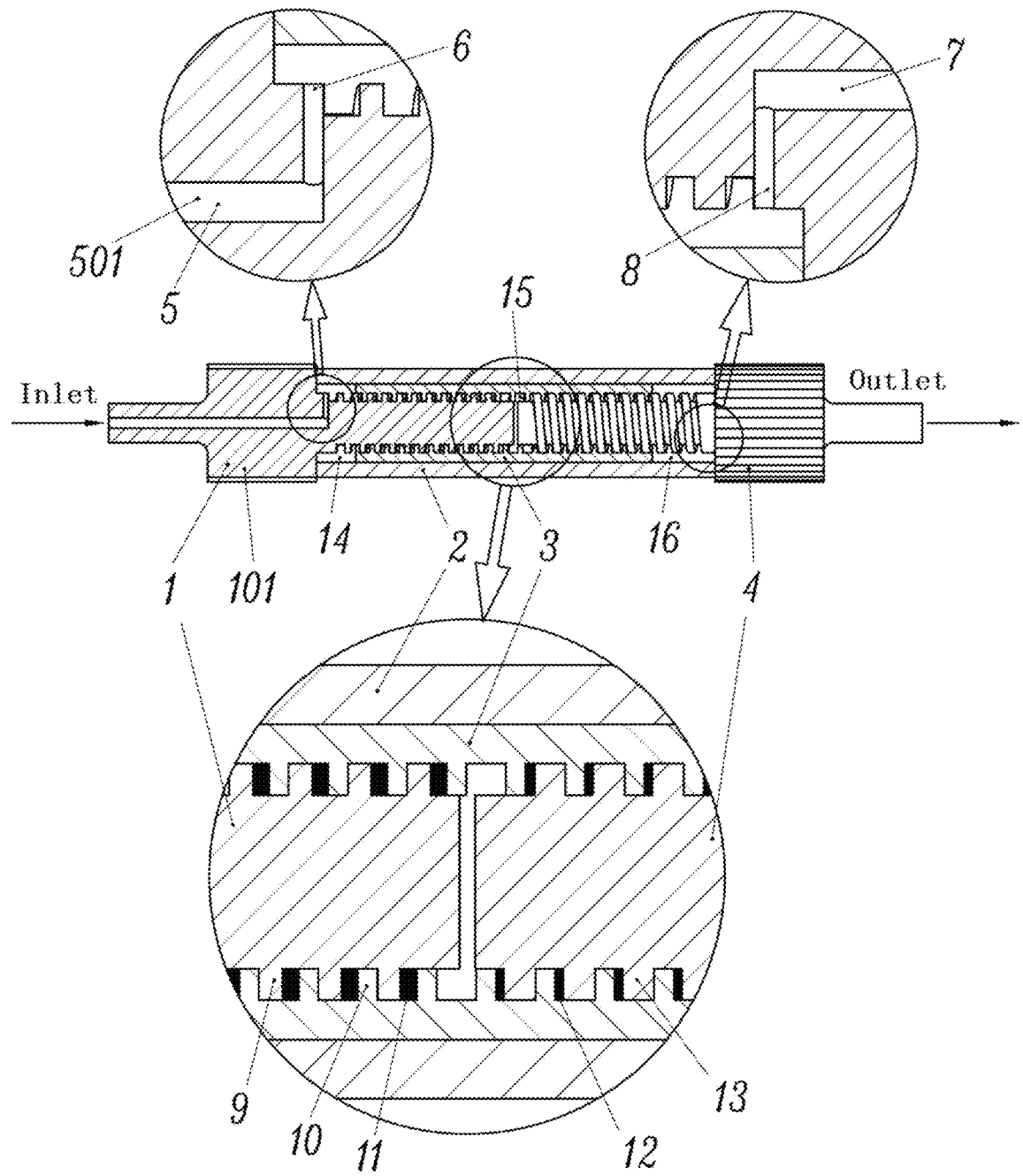
FIG. 1 is a structural schematic diagram of a main section in one of embodiments of the present disclosure.
Figure 2:
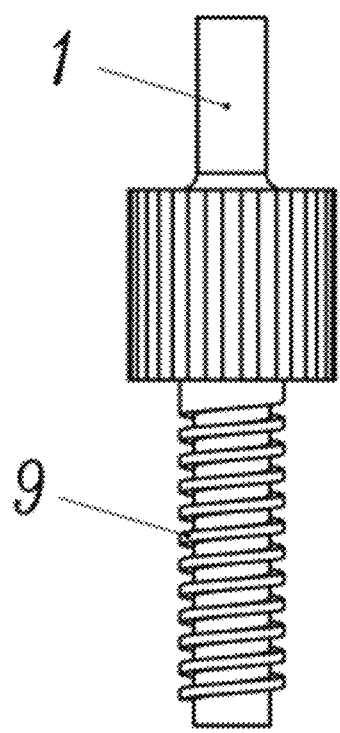
FIG. 2 is a front structural schematic diagram of a fine threaded rod in one of embodiments of the present disclosure.
Figure 3:
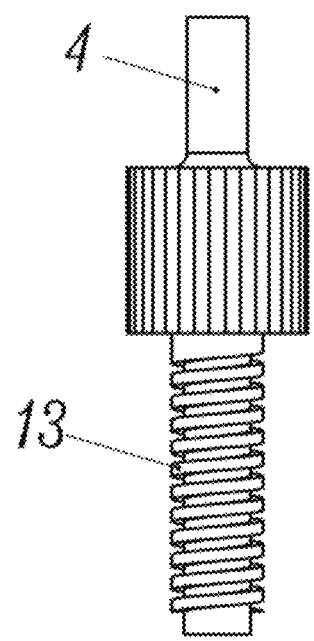
FIG. 3 is a front structural schematic diagram of a coarse threaded rod in one of embodiments of the present disclosure.
Figure 4:
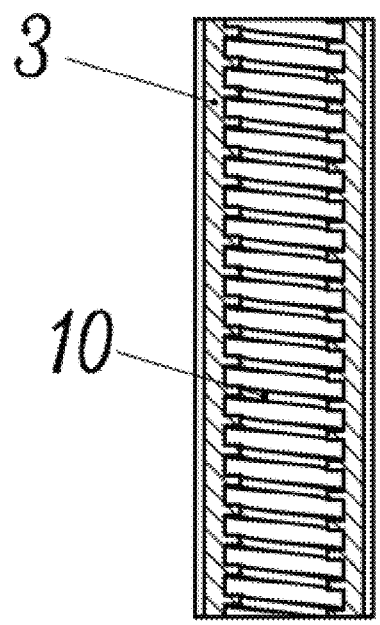
FIG. 4 is a section structural schematic diagram of an internal thread sleeve in one of embodiments of the present disclosure.
Figure 7:
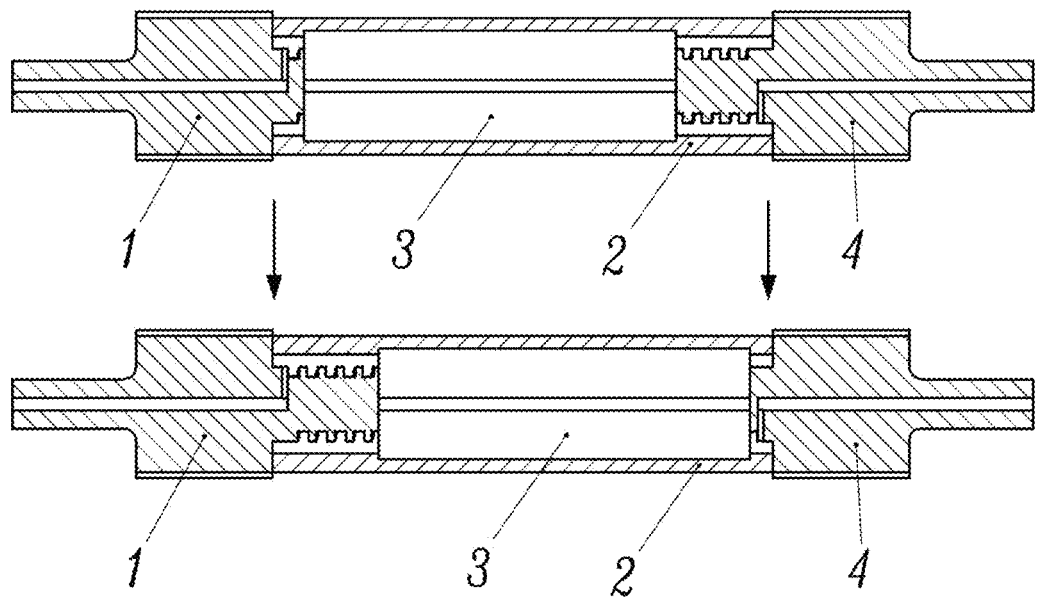
FIG. 7 is a section structural schematic diagram of a regulating structure in one of embodiments of the present disclosure.

The embodiment of the present disclosure provides a micro-flow throttling device as shown in FIG. 1 and FIG. 7. The micro-flow throttling device includes a casing 2 used for assembly and a throttling structure 5 mounted inside the casing 2 to form resistance to control a fluid flow. The regulating structure 1 includes an internal thread sleeve 3. The internal thread sleeve 3 is mounted inside the casing 2. An inner wall of the internal thread sleeve 3 is provided with an internal thread body 10. A coarse threaded rod 4 is mounted inside the internal thread sleeve 3. A fine threaded rod 101 is arranged on one side of the coarse threaded rod 4. A surface of the fine threaded rod 101 is provided with a fine thread body 9, and a surface of the coarse threaded rod 4 is provided with a coarse thread body 13. The inner diameter of the casing 2 is larger than the outer diameter of the internal thread sleeve 3. The fine threaded rod 101 and the fine thread body 9 are in threaded connection with the internal thread body 10. The internal thread sleeve 3 is of a sliding structure inside the casing 2.

The coarse thread flow channel 12 formed by the cooperation between the internal thread body 10 and the coarse thread body 13 generates resistance to the coarse thread flow channel 12 during the flow of a fluid, and then a phenomenon of fluid throttling is achieved, and then the throttled fluid is discharged from the interior of the device at the position of the second axial hole 7.

As shown in FIG. 1, FIG. 2, FIG. 3 and FIG. 4, the throttling structure 5 includes a first axial hole 501. The first axial hole 501 is formed inside a fine threaded rod 101. A first radial hole 6 is formed on one side of the first axial hole 501. A fine thread flow channel 11 is mounted on one side of the first radial hole 6. A second axial hole 7 is formed inside the coarse threaded rod 4. A second axial hole 8 is mounted on one side of the second axial hole 7. A coarse thread flow channel 12 is arranged on one side of the second radial hole 8. A second cavity 15 is formed between the fine thread flow channel 11 and a coarse thread flow channel 12. The first axial hole 501 and the first radial hole 6 are interconnected, and the first radial hole 6 and the fine thread flow channel 11 are interconnected. The second axial hole 7 and the second radial hole 8 are interconnected, and the second radial hole 8 and the coarse thread flow channel 12 are interconnected.

A first cavity 14 is formed in one side of the fine thread flow channel 11. A third cavity 16 is formed in one side of the coarse thread flow channel 12. The number of coarse and fine threads inside the internal thread sleeve 3 is regulated by rotating the regulating structure 1 and the coarse threaded rod 4. At the same time, the resistance of a fluid inside the casing 2 is regulated, and then flow regulation can be carried out when the fluid flows from the second axial hole 7.

Figure 5:
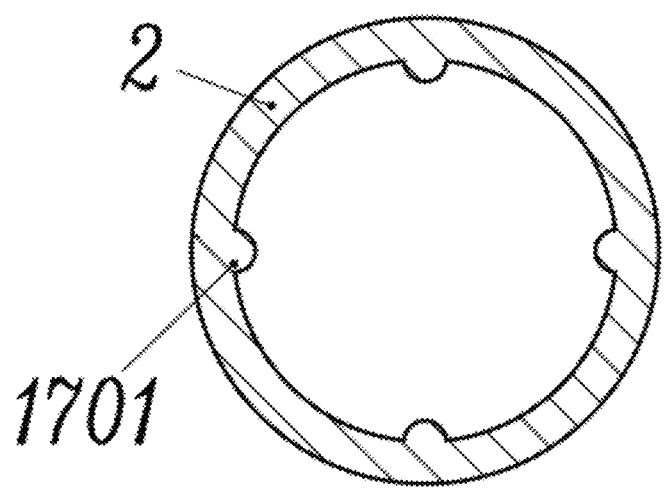
FIG. 5 is a section structural schematic diagram of a casing in one of embodiments of the present disclosure.
Figure 6:
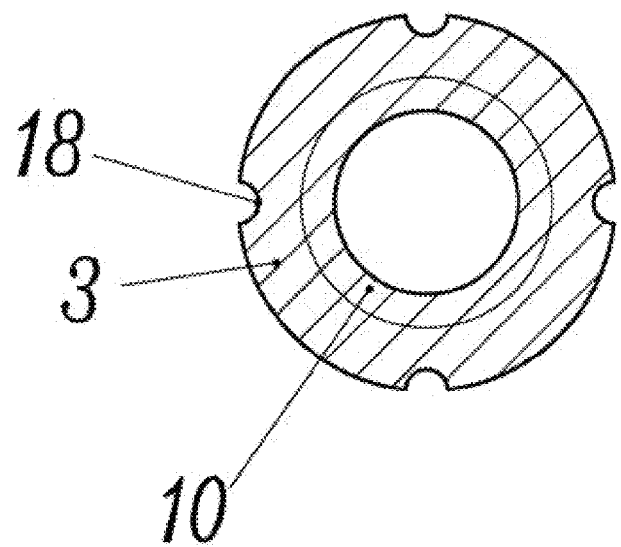
FIG. 6 is a section structural schematic diagram of an internal thread sleeve in one of embodiments of the present disclosure.
Figure 8:
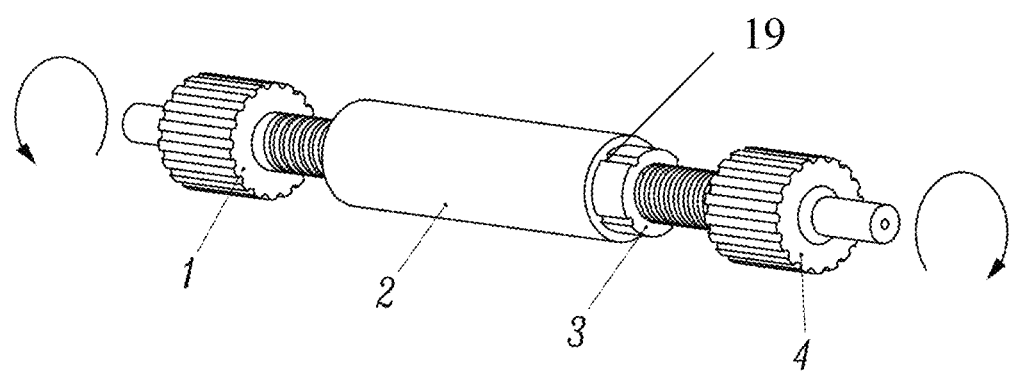
FIG. 8 is a solid structural schematic diagram of a disassembly structure in one of embodiments of the present disclosure.

As shown in FIG. 5, FIG. 6 and FIG. 8, the lugs 1701 are all arranged on the inner wall of the casing 2. Grooves 18 are formed in one side of the casing 2. Four groups of lugs 1701 are arranged on the inner wall of the casing 2, and the four groups of lugs 1701 are symmetrically distributed inside the casing 2. The lugs 1701 are able to be clamped by the grooves 18 to form a clamping structure 19.

When the internal thread sleeve 3 slides inside the casing 2, the lug 1701 slides inside the groove 18. The rotation of the internal thread sleeve 3 inside the casing 2 is limited by the cooperation between the lug 1701 and the groove 18, and the internal thread sleeve 3 is prevented from being twisted when the regulating structure 1 is twisted, so that the adjustment of the position of the casing 2 is affected.

The working process is as follows:

Firstly, the external fluid flows to the interior of the first radial hole 6 through the throttling structure 5. Then, the fluid inside the first radial hole 6 flows into the interior of the first cavity 14, and then flows into the fine thread flow channel 11 from the interior of the first cavity 14. Then, the fluid in the fine thread flow channel 11 flows into the interior of the second cavity 15. The fluid inside the second cavity 15 flows into the interior of the coarse thread flow channel 12 again. The fluid flows from the interior of the coarse thread flow channel 12 into the third cavity 16, and then is guided into the interior of the second axial hole 7 with the second radial hole 8. Then, the fluid is discharged through the second axial hole 7, the space between the fine thread flow channel 11 and the coarse thread flow channel 12 is changed, and then micro-flow throttling of the fluid is realized.

Secondly, the casing 2 is used for realizing the sealing of the flow channel, and can play a circumferential fixing role on the internal thread sleeve 3 and a supporting role on the regulating structure 1 and the coarse threaded rod 4. The position of the internal thread sleeve 3 can be regulated by twisting the regulating structure 1 and the coarse threaded rod 4. At the same time, the lengths of the fine thread flow channel 11 and the coarse thread flow channel 12 in the internal thread sleeve 3 can also be regulated, so that linear fine-tuning of the throttling effect is realized.

Finally, by rotating the regulating structure 1 and the coarse threaded rod 4, the device can be quickly disassembled and assembled through the cooperation between the internal thread body 10, the fine thread body 9 and the coarse thread body 13 inside the internal thread sleeve 3. At the same time, the lug 1701 and the groove 18 are butted and matched with each other to limit the position of the internal thread sleeve 3 when moving inside the casing 2. Finally, all the work of the device is completed.

In the description of the present disclosure, it needs to be illustrated that the indicative direction or position relations of the terms such as "upper", "lower", "front", "rear", "left", "right", "vertical", "horizontal", "top", "bottom", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

Preferably, the lugs are able to be clamped by the grooves to form a clamping structure 19.

Compared with the prior art, the present disclosure has the following beneficial effects.

Firstly, components with gaps among parts through interaction among four parts can pass through micro flow channels (lower than 0.3 g/s), and the flowing resistance of a propellant solves the throttling problem in the field of micro-thrust single-component engines.

Secondly, by changing the relative position of the internal structure, the micro-flow throttling and linear fine-tuning of the throttling effect can be realized. The device is suitable for various requirements of the propellant throttling of the micro-thrust single-component engine, and then the applicability of the device is enhanced.

Thirdly, the device is simple in structure and convenient to mount without tooling assistance, and can complete positioning only by twisting. Through the cooperation between the lugs and the grooves, the movement of the internal thread sleeve inside the casing is limited, and many cumbersome steps in the early installation and disassembly process are avoided, so that the practicability of the device is realized. At the same time, the convenience of the device during later repair and maintenance is improved.

Specific embodiments of the present disclosure have been described above. It should be understood that the present disclosure is not limited to the particular embodiments described above, and those skilled in the art may make various changes or modifications within the scope of the claims which do not affect the substance of the present disclosure. In absence of conflicts, the following embodiments and features in the embodiments may be combined with one another.

What is claimed is:

1. A micro-flow throttling device, comprising a casing used for assembling;
   a throttling structure mounted inside the casing to form resistance to control a fluid flow;
   a regulating structure mounted on the casing and used for regulating a flow rate of a fluid; and
   lugs mounted on an inner wall of the casing and used for performing disassembly and assembly limiting on the throttling structure,
   wherein the throttling structure comprises a first axial hole, the first axial hole is formed inside a fine threaded rod, a first radial hole is formed on one side of the first axial hole, a fine thread flow channel is mounted on one side of the first radial hole, and a second cavity is formed between the fine thread flow channel and a coarse thread flow channel.

2. The micro-flow throttling device according to claim 1, wherein the regulating structure comprises an internal thread sleeve, the internal thread sleeve is mounted inside the casing, an inner wall of the internal thread sleeve is provided with an internal thread body, a coarse threaded rod is mounted inside the internal thread sleeve, and a fine threaded rod is arranged on one side of the coarse threaded rod.

3. The micro-flow throttling device according to claim 2, wherein a surface of the fine threaded rod is provided with a fine thread body, and a surface of the coarse threaded rod is provided with a coarse thread body.

4. The micro-flow throttling device according to claim 2, wherein an inner diameter of the casing is larger than an outer diameter of the internal thread sleeve, the fine threaded rod and a fine thread body are in threaded connection with the internal thread body, and the internal thread sleeve is of a sliding structure inside the casing.

5. The micro-flow throttling device according to claim 2, wherein a second axial hole is formed inside the coarse threaded rod, a second radial hole is mounted on one side of the second axial hole, the second axial hole and the second radial hole are interconnected, a coarse thread flow channel is arranged on one side of the second radial hole, and the second radial hole and the coarse thread flow channel are interconnected.

6. The micro-flow throttling device according to claim 1, wherein the first axial hole and the first radial hole are interconnected, and the first radial hole and the fine thread flow channel are interconnected.

7. The micro-flow throttling device according to claim 1, wherein the lugs are all arranged on the inner wall of the casing, and grooves are formed in one side of the casing.

8. The micro-flow throttling device according to claim 7, wherein four groups of lugs are arranged on the inner wall of the casing, and the four groups of lugs are symmetrically distributed inside the casing.

9. The micro-flow throttling device according to claim 7, wherein the lugs are able to be clamped by the grooves to form a clamping structure.

* * * * *